United States Patent
Michalski et al.

(10) Patent No.: US 6,758,976 B2
(45) Date of Patent: *Jul. 6, 2004

(54) SIMPLIFIED PURIFICATION OF PHOSPHORIC ACID PLANT POND WATER

(75) Inventors: Dennis Michalski, Lakeland, FL (US); Kenneth J. Jardine, Lakeland, FL (US); Vaughn V. Astley, Lakeland, FL (US)

(73) Assignee: IMC Global Operations Inc., Lake Forest, IL (US)

( * ) Notice: Subject to any disclaimer, the term of this patent is extended or adjusted under 35 U.S.C. 154(b) by 134 days.

This patent is subject to a terminal disclaimer.

(21) Appl. No.: 10/082,564

(22) Filed: Feb. 21, 2002

(65) Prior Publication Data

US 2003/0085178 A1 May 8, 2003

Related U.S. Application Data

(60) Provisional application No. 60/353,359, filed on Oct. 25, 2001.

(51) Int. Cl.$^7$ .................................................. C02F 1/58
(52) U.S. Cl. ........................ 210/696; 210/638; 210/639; 210/724; 210/726; 210/906; 423/321.1; 423/331; 423/332
(58) Field of Search ................................ 210/638, 639, 210/724, 725, 726, 727, 906, 915, 696; 423/312, 321.1, 331, 332, 333, 490

(56) References Cited

U.S. PATENT DOCUMENTS

| | | | |
|---|---|---|---|
| 3,551,332 A | 12/1970 | Baumann et al. | 210/53 |
| 3,725,265 A | 4/1973 | Legal, Jr. | 210/45 |
| 4,110,219 A | 8/1978 | Maples | 210/245 |
| 4,171,342 A | 10/1979 | Hirko et al. | 423/160 |
| 4,213,952 A * | 7/1980 | Sikdar | 423/339 |
| 4,320,012 A | 3/1982 | Palm et al. | 210/713 |
| 4,574,049 A | 3/1986 | Pittner | 210/639 |
| 4,698,163 A | 10/1987 | Zibrida | 210/713 |
| 4,876,002 A | 10/1989 | Marshall et al. | 210/136 |
| 5,006,234 A | 4/1991 | Menon et al. | 210/98 |
| 5,104,589 A | 4/1992 | Palmer et al. | 261/120 |
| 5,112,499 A | 5/1992 | Murray et al. | 210/713 |
| 5,200,165 A | 4/1993 | Harper et al. | 423/339 |
| 5,316,748 A | 5/1994 | Palm et al. | 423/320 |
| 5,338,456 A | 8/1994 | Stivers | 210/652 |
| 5,409,614 A | 4/1995 | Gallup et al. | 210/700 |
| 5,453,206 A | 9/1995 | Browne | 210/711 |
| 5,595,717 A | 1/1997 | Harper et al. | 423/339 |
| 6,190,558 B1 | 2/2001 | Robbins | 210/652 |
| 6,537,456 B2 * | 3/2003 | Mukhopadhyay | 210/652 |

FOREIGN PATENT DOCUMENTS

GB 1 505 146 3/1978

OTHER PUBLICATIONS

Nielsson, Francis T., ed., *Manual of Fertilizer Processing*, Marcel Dekker, Inc. (1987), pp. 480–482.

Mooney, G.A. et al., *Removal of Fluoride and Phosphorus from Phosphoric Acid Wastewatrs*, Proceedings of the 334rd Industrial Waste Conference, Purdue Univ. (1978), pp. 286–295.

Mooney, G.A. et al., *Laboratory and Pilot Treatment of Phosphoric Acid Wastewaters*, Joint Meeting of Central Florida and Peninsular, Florida A.I.Ch.E. (1977), pp.1–28.

Ruthven, Douglas M., ed., *Encyclopedia of Separation Technology*, vol. 2, John Wiley & Sons, Inc. (1997), pp. 1398–1430.

* cited by examiner

*Primary Examiner*—Peter A. Hruskoci
(74) *Attorney, Agent, or Firm*—Sidley Austin Brown & Wood LLP

(57) ABSTRACT

A simplified process for the partial purification of contaminated phosphoric acid plant pond water having a molar calcium plus magnesium to fluorine ratio greater than or equal to about 0.60, is described, in which the pond water is treated with a basic compound, clarified, aged, clarified again and re-acidified. The thus treated pond water, still containing the majority of the phosphate originally present, can then be concentrated via the removal of essentially pure water, using any conventional means of concentration, without the formation of solid precipitates.

15 Claims, No Drawings

SIMPLIFIED PURIFICATION OF PHOSPHORIC ACID PLANT POND WATER

This application claims the benefit of U.S. Provisional Application entitled "Purification of Phosphoric Acid Plant Pond Water," Serial No. 60/353,359, filed on Oct. 25, 2001. This application is related to the application entitled "PURIFICATION OF PHOSPHORIC ACID PLANT POND WATER," by applicants Dennis H. Michalski, et. al., filed concurrently herewith, and which is incorporated in its entirety herein by reference.

BACKGROUND OF THE INVENTION

Production of phosphoric acid by what is commonly know as the "wet process" involves the reaction of finely ground phosphate rock with sulfuric acid. As a result of the various reactions, a slurry is produced containing phosphoric acid, calcium sulfate and various impurities derived from the phosphate rock. This slurry is normally filtered to separate the phosphoric acid product from the byproduct calcium sulfate. The phosphoric acid thus obtained is then used in the production of various phosphate fertilizers that are used in agriculture. Water is normally used to wash the calcium sulfate filter cake and thereby increase the recovery of the phosphoric acid product. Most of this wash water is fed back into the phosphoric acid production process as make-up water. However, a portion of this water remains trapped in the calcium sulfate filter cake and is discharged from the filter with the filter cake. This trapped water contains small amounts of phosphoric acid and small amounts of all other impurities that were present in the phosphoric acid product. Additional water is normally used to wash the calcium sulfate filter cake off of the filter and transport it, by pumping as a slurry, to a storage or disposal area.

At the storage or disposal area the calcium sulfate will settle and the excess water will be liberated. This liberated water will normally be collected in a system of channels and ponds and recycled to the phosphoric acid production plant for reuse (i.e., washing the calcium sulfate filter cake). These channels and ponds also serve as a collection means for other water that is used in and around the phosphoric acid plant, such as for cleaning or washing, fresh water fume scrubbers, and as a collection means for phosphoric acid spills or leaks within the plant. Also, since these channels and ponds are located outside, they collect rain water.

Since all of the water contained within these channels and ponds contains small amounts of phosphoric acid and other impurities normally present in the phosphoric acid, it is considered contaminated. Thus, before this water can be released to the environment, it must be treated or purified to remove the phosphoric acid and other impurities. In some cases, in an efficiently operated phosphoric acid plant, in the absence of severe weather conditions, a balance will exist between water input to the pond system and water evaporation such that virtually all of this contaminated water can be recycled and used within the plant. In this case, treatment and discharge of the contaminated water, commonly known as pond water, is not necessary.

However, there are circumstances under which treatment and discharge of the contaminated pond water is necessary. One such circumstance could be an extended period of abnormally heavy rainfall. Another such circumstance would be when the phosphoric acid plant has ceased operation ether for an extended period of time or permanently.

Many factors influence the specific components and their concentrations in this contaminated pond water. Thus, there is no typical composition for the pond water other than the fact that it will contain some phosphate. However, some of the chemical components that could be found in pond water, and an example of their range of concentrations, are as follows:

| CHEMICAL COMPONENT | RANGE OF CONCENTRATION |
|---|---|
| P | 1700–12,000 ppm |
| $SO_4$ | 4300–9600 ppm |
| F | 200–15,000 ppm |
| Si | 100–4100 ppm |
| (ammoniacal) N | 40–1500 ppm |
| Na | 1200–2500 ppm |
| Mg | 160–510 ppm |
| Ca | 450–3500 ppm |
| K | 80–370 ppm |
| Fe | 5–350 ppm |
| Al | 10–430 ppm |
| Cl | 10–300 ppm |

One method of treating or purifying this pond water well known in the art is double liming. This method consists of adding a calcium compound (such as $CaCO_3$, $Ca(OH)_2$ or CaO) to the pond water, in two stages, such that the phosphate and other impurities form solid precipitates that settle and are separated from the thus purified water. This method is described in Francis T. Nielsson, ed., *Manual of Fertilizer Processing*, Marcel Dekker, Inc. (1987), pp. 480 to 482; G. A. Mooney, et al., *Removal of Fluoride and Phosphorus from Phosphoric Acid Wastes with Two Stage Line Treatment*, Proceedings of the 33rd Industrial Waste Conference, Purdue Univ. (1978); G. A. Mooney et al., *Laboratory and Pilot Treatment of phosphoric Acid Wastewaters*, presented at the Joint Meeting of Central Florida and Peninsular, Florida A.I.Ch.E. (1977); and U.S. Pat. Nos. 5,112,499; 4,698,163; 4,320,012; 4,171,342; 3,725,265 and 3,551,332. However, there are several problems associated with this method. One problem is the large volume of sludge produced. Sludge (i.e., a mixture of the precipitated impurities, un-reacted calcium compound and water) is produced in both the first and second stages of this process. These sludge materials are normally deposited in settling ponds that require large land areas. While it is possible to reclaim and recycle some of the sludge from the first stage of this process, the sludge from the second stage tends to be very voluminous, extremely difficult to de-water and of little economic value. Thus, large impoundment ponds are required to permanently store this sludge. Another problem with this method of pond water treatment is that, because of the large quantity of water tied up with the sludge, only about 50% to 60% of the pond water fed to the process can be discharged. Thus, the process equipment must be significantly larger than would otherwise be needed. A third problem with this process is that virtually all of the economically valuable phosphate contained in the pond water is converted to a form that renders it unsuitable for use as a fertilizer without significant re-processing at added cost. Finally, a fourth problem with this treatment process is that the purified pond water often just barely meets the criteria for discharge and cannot be used as a substitute for the fresh water that would normally be required in a phosphoric acid plant, such as for steam production.

Another general method of water purification is reverse osmosis. This process is based on the application of external pressure on an aqueous salt solution in contact with a semi permeable membrane, such that the applied pressure exceeds the osmotic pressure of the water component of the solution in contact with the membrane. Thus, some of the water is forced through the membrane in the reverse direction, while the other components in the solution (i.e., soluble salts) do not pass through the membrane. This results in a stream of purified water, known as permeate, and a stream of increased salt content, known as the reject or concentrate. Reverse osmosis is well known in the art and is described in *Encyclopedia of Separation Technology*, Volume 2, pp. 1398–1430, edited by Douglas M. Ruthven, John Wiley & Sons, Inc., 1997; Reverse Osmosis/Ultrafiltration Principles by S. Sourirajan and T. Matssuura, National Research Council of Canada, Ottawa, Canada, 1985; Reverse Osmosis Technology, B. Parekh, ed., Marcel Dekker, Inc., New York, 1988; Membrane Processes by R. Rautenbach and R. Albrecht, John Wiley & Sons, Inc., New York, 1989 and other publications. Reverse osmosis is also described in a variety of U.S. Patents, for example, U.S. Pat. Nos. 4,110,219; 4,574,049; 4,876,002; 5,006,234; 5,133,958 and 6,190,558.

Several attempts have been made to use reverse osmosis for the purification of contaminated phosphoric acid plant pond water. However, these attempts have generally failed due to the fact that the pond water is a saturated solution. Thus, as soon as any water is removed from the pond water the solution becomes supersaturated and salts precipitate that quickly clog the membranes used in reverse osmosis and prevent additional pure water from flowing through them.

However, if reverse osmosis could be made to function in the treatment of contaminated phosphoric acid plant pond water, many economic and environmental benefits would result. One benefit is that the phosphate values contained in the pond water would be recovered in an economically useful form (i.e., as a concentrated liquid phosphate solution). Another benefit is that vast land areas required for the settling ponds needed in the double liming process will be greatly reduced and the large impoundment ponds needed for permanent sludge storage will be eliminated. A third benefit is that the purified water obtained from the reverse osmosis system is of sufficient purity such that it can be used in place of fresh water in places where fresh water is required (i.e., certain fume scrubbers, steam boiler feed systems, etc.). Still other benefits will be obvious to those skilled in the art.

SUMMARY OF THE INVENTION

It is an object of this invention to provide a simplified process for the pre-treatment of contaminated phosphoric acid plant pond water (hereinafter called "pond water"), when the molar ratio of the calcium plus magnesium to fluorine present in the pond water is greater than or equal to about 0.60, such that the pre-treated pond water can be purified using conventional reverse osmosis technology.

It is another object of this invention to provide a process for the pre-treatment or partial purification of pond water such that the pre-treated pond water can be concentrated by the removal of pure water, using any suitable apparatus, without the formation of solid precipitates in the solution thus concentrated.

It is another object of this invention to provide a process for the partial purification of pond water such that the partially purified pond water can be processed by a conventional reverse osmosis system continuously without the precipitation of compounds within the reverse osmosis system that would clog the membranes employed within the system rendering them inoperative.

It is another object of this invention to provide a process for the selective removal of specific ions and compounds from pond water to an extent such that the thus processed pond water can be further processed by a conventional reverse osmosis system to produce a permeate stream composed of essentially pure water and a reject or concentrate stream composed of the phosphate component and other impurities present in the processed pond water fed to the reverse osmosis system.

It is also an object of this invention to provide a process for the purification of pond water that will significantly reduce the quantity of undesirable sludge that is generated.

These and other objects are achieved by the present invention which provides a simplified process for partial purification pre-treatment of pond water-comprising the steps of adding a first basic compound that will cause the precipitation of an essentially insoluble salt containing the majority of the calcium and fluorine in the pond water while allowing the majority of the phosphate to remain in solution (i.e., the phosphate salts of the base are soluble), allowing the precipitates thus formed to settle, decanting or otherwise separating the clarified liquid portion of the mixture, holding the liquid portion of the mixture for a time period sufficient to allow any silicic acid present to decompose into hydrated silicon dioxide, separating the hydrated silicon dioxide and adding an acid to the liquid solution thus obtained, such that the solubility of the ions remaining in solution are increased and are greater than or equal to their concentrations that are expected in the thus treated solution when the solution is concentrated via the removal of essentially pure water.

DETAILED DESCRIPTION OF THE PREFERRED EMBODIMENTS

The present invention provides a simplified process for partially purifying contaminated phosphoric acid plant pond water, when the molar ratio of the calcium plus magnesium to fluorine present in the pond water is greater than or equal to about 0.60, such that the partially purified or pre-treated pond water can be concentrated by the removal of pure water without the formation of precipitated solids or scale that would otherwise impede or render inoperable the concentrating means or apparatus. Thus, for example, the pre-treated pond water could be processed through a conventional reverse osmosis system comprising one or more stages to obtain a purified water stream and a stream of concentrated pond water. The term "pond water," as used herein, is defined as a dilute solution of phosphoric acid, also containing sulfuric acid, silicic acid, fluoride ions, calcium ions, sodium ions, ammonium ions, and other ionic and non-ionic species, that is normally present in and around phosphate fertilizer plants that employ the so-called wet process for the production of phosphoric acid.

In the process of the present invention, a first compound that is a strong base or that will form a strong base when water is present is added to the pond water. The cationic component of this first compound must be such that the phosphate salts formed thereof remain soluble in the pond water. Examples of strongly basic compounds that form soluble phosphate salts include sodium hydroxide and potassium hydroxide. An example of a compound that will form a strong base when water is present and whose phosphate salt is soluble is ammonia. Other compounds meeting the above two criteria may also be used and are still considered within the scope of the present invention. This first compound is added to and mixed with the pond water either in pure form or as a solution, in sufficient quantity to increase the pH of the resulting pond water solution to a value within the range of 6.0 to 8.0, or more preferably within the range of 6.5 to 7.5. The term "pure form," as used above refers to the physical state of the compound (i.e., a solid for sodium hydroxide or potassium hydroxide, or a gas or pressurized liquid for anhydrous ammonia) and not the chemical purity of the compound. In terms of chemical purity, ordinary technical grade purity is acceptable for both the first compound and the second compound.

The pH, as used above and elsewhere, is defined as the negative power to which 10 must be raised to equal the molar hydrogen ion concentration in solution.

As a result of the addition of the first compound to the pond water and the resulting chemical reactions, solid precipitates will form in the solution. These solid precipitates are now removed from the solution either by settling the solids and decanting the liquid, centrifuging the solution, filtering the solution, or any other means that will result in a separation of a clear liquid from the solid precipitates. Furthermore, it is not necessary that all of the liquid be removed from the solids. Thus, the solids can be removed as a slurry containing, for example, 50% by weight solids and 50% by weight liquid. Also, it is not essential that all of the solids be removed from the liquid, although it is preferred that the suspended solids concentration in the liquid be no greater than 0.5% by weight.

If the clear liquid thus obtained is subjected to chemical analysis, it will be found that the calcium and fluorine concentrations have been significantly reduced, as compared to the starting pond water, while the phosphate concentration has only been reduced by a comparatively minor amount.

The clear liquid is now allowed to age. The purpose of the aging is to allow silicic acid present in the liquid to decompose into hydrated silicon dioxide. The aging time should be at least 2 hours and preferably at least 16 hours. While there is no upper limit to the aging time, and longer aging times have been found to be beneficial, practicality and economics dictate that the maximum aging time would normally be limited to about 10 days or less.

If the initial silicon concentration in the pond water is less than about 120 parts per million, a hydrated silicon dioxide precipitate may not form and the aging and hydrated silicon dioxide separation steps indicated above will not be required.

After the aging period, the hydrated silicon dioxide formed as a result of the aging process must be removed from the liquid. This can be done by any conventional solid liquid separation technique including centrifuging, filtering or settling. Of particular utility is the use of a flocculent, specifically a cationic flocculent, followed by settling of the flocculated silicon dioxide and decantation of the liquid. The quantity of flocculent required and the method of addition will depend, among other factors, on the concentration of hydrated silicon dioxide in the liquid and the specific flocculent used. Thus, laboratory tests, by techniques well known in the art, would be required to determine the flocculent addition parameters. The use of a flocculent for hydrated silicon dioxide removal is not considered a part of the present invention and is presented only to illustrate a useful means of accomplishing the part of the present invention comprising silica removal from the partially pretreated pond water. The use of flocculants for silica removal is taught in U.S. Pat. Nos. 5,595,717; 5,453,206; 5,409,614 and 5,200,165.

At this point in the process, the majority of the calcium and fluorine originally present in the pond water have been removed. Thus, the pond water has been partially purified.

After the removal of the precipitated solids produced as a result of the first compound addition and removal of the hydrated silicon dioxide, if required, a clear liquid is obtained that is essentially saturated with respect to various ions and salts thereof. To permit the removal of pure water from this liquid solution, without causing precipitation of these salts, the solubility relationships of these salts within the solution must be adjusted. This is accomplished be adding an acid to the solution, or a compound that will form an acid when water is present, so as to cause a decrease in the pH.

A method of decreasing the pH by the addition of an acid is taught in U.S. Pat. No. 5,338,456. However, in the process described in U.S. Pat. No. 5,338,456 the acid is added to convert carbonates (for example calcium carbonate) to carbon dioxide such that the carbon dioxide can be removed from the water in the forced draft and vacuum degasifiers. Thus, the net effect of the acid addition in U.S. Pat. No. 5,338,456 is to decrease the solubility of the carbon compounds in solution and not to increase the solubility of the various ions and salts present, as is the purpose of the acid addition in the pond water of the present invention. Examples of acids that may be used include sulfuric acid, sulfurous acid, phosphoric acid, hydrochloric acid and nitric acid. Examples of compounds that may be used that will form an acid when water is present include sulfur trioxide, sulfur dioxide, hydrogen chloride and nitrogen dioxide. Other acids, or compounds that will form acids in the presence of water, may be used and are still considered within the scope of the present invention. Acids that should not be used for pH adjustment include hydrofluoric acid and hydroflurosilicic acid. The acid or the compound that will form an acid in the presence of water should be added to the liquid in sufficient quantity to decrease the pH of the resulting solution to a value within the range of 2.0 to 4.0, or more preferably within the range of 2.5 to 3.5, or still more preferably within the range of 2.9 to 3.1.

The liquid solution thus obtained will be essentially clear and stable with respect to post precipitation. In addition, pure water may now be removed from the liquid solution by any of several methods including reverse osmosis, evaporation, or other means, without the formation of solid precipitates.

The process of this invention will be better understood with reference to the following example. It is understood, however, that this example is intended only to illustrate the invention and is not intended to limit the invention. All percentages used in the following example, unless noted otherwise, are understood to mean percent by weight.

EXAMPLE 1

A 1000.3 gram sample of contaminated phosphoric acid plant pond water containing 0.4092% $P_2O_5$, 0.0582% Ca, 0.0445% F, 0.0098% Si and 0.5307% $SO_4$ was obtained from a commercial wet process phosphoric acid plant pond system. To this sample, 5.52 grams of 50% sodium hydroxide solution was added to and mixed for 7 minutes. After mixing the pH of the above solution was 7.28. The solution was then allowed to stand, whereupon the solids precipitated as a result of the chemical reactions between the sodium hydroxide and pond water settled to form a sludge at the bottom of the container. After 16 hours, 916 grams of clear liquid was decanted from the above container, leaving a sludge that represented 8.40% by weight of the initial pond water and sodium hydroxide solution. Since the initial silicon concentration in the pond water sample was less than the value at which hydrated silicon dioxide would form (i.e., about 0.0120%), the aging step for the hydrolysis of the silicic acid to hydrated silicon dioxide was not required. The pH of the resulting clear liquid was then adjusted to a value of 3.01 via the addition of 1.41 grams of 96% sulfuric acid. Laboratory analysis of a sample of the solution at this point indicated that it contained 0.238% $P_2O_5$, 0.0026% Ca and 0.0089% F.

A 791.51 gram sample of this solution was then placed in a beaker on a laboratory stirrer-hotplate and heat was applied while stirring the solution to evaporate water. This process was continued until the final weight of the solution was 59.23 grams, thus indicating that 732.28 grams of water had been evaporated. At this point, the remaining solution was still clear with no evidence of precipitated solids. Laboratory analysis of a sample of the evaporated solution indicated that it now contained 3.38% $P_2O_5$, 0.0705% Ca and 0.1 506% F.

Although the present invention has been described in connection with specific example, it is to be understood that various modifications are possible and this invention is to be limited only be the scope of the appended claims.

What is claimed is:

1. A process for the partial purification of pond water such that said pond water can be further purified by the removal of essentially pure water without solids precipitation, comprising the steps of:

adding a first compound to a quantity of pond water to increase the pH of the resulting solution, said first compound being a base or forming a base when water is present, said first compound having a cationic portion such that phosphate salts thereof remain soluble in said solution, allowing any precipitates formed as a result of the addition of the first compound to settle, separating the precipitates and recovering a clarified liquid portion of the mixture, holding said clarified liquid portion of the mixture for a time period sufficient to allow any silicic acid present in the clarified portion to decompose into a hydrated silicon dioxide sludge, separating the hydrated silicon dioxide sludge and recovering a clear solution; and adding a second compound to decrease the pH of the clear solution, said second compound being an acid or acid-forming compound such that the solubility of ions remaining in the clear solution is increased.

2. The process, as claimed in claim 1, wherein said first compound is selected from the group consisting of sodium hydroxide and potassium hydroxide.

3. The process, as claimed in claim 1, wherein said first compound is ammonia.

4. The process, as claimed in claim 1, wherein said first compound is added to said pond water as an aqueous solution.

5. The process, as claimed in claim 1, wherein said first compound is added to said pond water in anhydrous or essentially anhydrous form.

6. The process, as claimed in claim 1, wherein said first compound is added to said pond water in sufficient quantity to increase the pH of said resulting solution to a value within the range of 6.0 to 8.0.

7. The process, as claimed in claim 1, wherein said first compound is added to said pond water in sufficient quantity to increase the pH of said resulting solution to a value within the range of 6.5 to 7.5.

8. The process, as claimed in claim 1, wherein after separating the clarified liquid from said precipitates formed as a result of the addition of said first compound, the clarified liquid is aged for a time period within the range of 16 hours to 10 days.

9. The process, as claimed in claim 1, wherein after separating the clarified liquid from the sludge formed as a result of the addition of the first compound, the clarified liquid is aged for a time period within the range of 36 hours to 72 hours.

10. The process, as claimed in claim 1, wherein after separating said hydrated silicon dioxide sludge, said second compound is added to said clear solution thus obtained in sufficient quantity to lower the pH of the solution to a value within the range of 2.0 to 4.0.

11. The process, as claimed in claim 1, wherein after separating said hydrated silicon dioxide sludge, said second compound is added to said clear solution thus obtained in sufficient quantity to lower the pH of the solution to a value within the range of 2.5 to 3.5.

12. The process, as claimed in claim 1, wherein after separating said hydrated silicon dioxide sludge, said second compound is added to said clear solution thus obtained in sufficient quantity to lower the pH of the solution to a value within the range of 2.9 to 3.1.

13. The process, as claimed in claim 1, wherein said second compound added to said clear solution obtained after the separation of said hydrated silicon dioxide sludge is selected from the group consisting of sulfuric acid, sulfurous acid, phosphoric acid, hydrochloric acid and nitric acid.

14. The process, as claimed in claim 1, wherein said second compound added to said clear solution obtained after the separation of said hydrated silicon dioxide sludge is sulfuric acid.

15. The process, as claimed in claim 1, wherein said second compound added to said clear solution obtained after the separation of said hydrated silicon dioxide sludge, is selected from the group consisting of sulfur trioxide, sulfur dioxide, hydrogen chloride and nitrogen dioxide.

* * * * *